United States Patent [19]

Maestas et al.

[11] Patent Number: 4,977,596

[45] Date of Patent: Dec. 11, 1990

[54] CRYPTOGRAPHIC SYNCHRONIZATION RECOVERY BY MEASURING RANDOMNESS OF DECRYPTED DATA

[75] Inventors: Joseph H. Maestas; Lyndon G. Pierson, both of Albuquerque, N. Mex.

[73] Assignee: The United States of America as represented by the United States Department of Energy, Washington, D.C.

[21] Appl. No.: 323,923

[22] Filed: Mar. 15, 1989

[51] Int. Cl.$^5$ ............................................. H04L 9/00
[52] U.S. Cl. ...................................... 380/48; 380/46; 375/114; 370/100.1; 370/107
[58] Field of Search .................... 380/48, 46; 375/114, 375/115, 116; 370/100, 107

[56] References Cited

U.S. PATENT DOCUMENTS

| | | | |
|---|---|---|---|
| 3,550,082 | 12/1970 | Tong | 340/146.1 |
| 4,375,102 | 2/1983 | Van Daal | 375/94 |
| 4,377,863 | 3/1983 | Legory et al. | 371/42 |
| 4,654,480 | 3/1987 | Weiss | 380/48 |
| 4,827,514 | 5/1989 | Zioko et al. | 380/48 |

OTHER PUBLICATIONS

J. Massey et al., "A Self-Synchronizing Digital Scrambler for Cryptographic Protection of Data", 1984 *International Zurich Seminar on Digital Communications*, Mar. 6–8, 1984, Zurich/Switzerland, Swiss Federal Insititue of Technology, pp. 163–169.
W. Pomper, "The DES Modes of Operation and Their Synchronization" *International Telemetering Conference*, Sep. 28–30, 1982, Vol. XVIII, 1982, pp. 837–851.
C. Mitchell et al., "A Classification of Time Element Speech Scramblers", *Journal of the Institution of Electronic and Radio Engineers*, vol. 55, No. 11/12, pp. 391–396, Nov./Dec. 1985.
E. Witzke, "Cryptographic Synchronization Loss Detection/Resynchronization Monitor Design, Maintenance, and Operations Guide", Jun. 1985, BDM/A-8-5-0591-TR.
Data Sheet 387-A for Crypto Sync Controller, RESDEL CSC-6, RESDEL Engineering Corporation.
Specification Sheet for Crypto Ancillary Unit, CAU 4100, and CAU 4200, Data Communications Products.

*Primary Examiner*—Thomas H. Tarcza
*Assistant Examiner*—David Cain
*Attorney, Agent, or Firm*—Karla Ojanen; James H. Chafin; William R. Moser

[57] ABSTRACT

The invention relates to synchronization of encrypted data communication systems and a method which looks for any lack of pattern or intelligent information in the received data and triggers a resynchronization signal based thereon. If the encrypter/decrypter pairs are out of cryptographic synchronization, the received (decrypted) data resembles pseudorandom data. A method and system are provided for detecting such pseudorandom binary data by, for example, ones density. If the data is sufficiently random the system is resynchronized.

14 Claims, 7 Drawing Sheets

CRYPTOGRAPHIC SYNCHRONIZATION RECOVERY BY DETECTION OF RANDOM BIT SEQUENCES

FIGURE 1 - CRYPTOGRAPHIC SYNCHRONIZATION RECOVERY BY DETECTION OF RANDOM BIT SEQUENCES

FIGURE 2 - DETECTING AVERAGE ONES DENSITY

FIGURE 3(a) - $\Delta 1 \neq 0$

FIGURE 3(b) - $\Delta 1 = 0$

FIGURE 4(a) - IN TERMS OF INTEGERS: $\Delta 1' \neq 0$ AND $\Delta 1^* \neq 0$

FIGURE 4(b) - IN TERMS OF INTEGERS: $\Delta 1 = 0$

FIGURE 5(a) - $\Delta 1' \neq 0$ AND $\Delta 1'' \neq 0$

FIGURE 5(b) - $\Delta 1' = 0$ AND $\Delta 1'' = 0$

FIGURE 6(a) - IN TERMS OF INTEGERS: $\Delta 1' \neq 0$ AND $\Delta 1'' \neq 0$

FIGURE 6(b) - IN TERMS OF INTEGERS: $\Delta 1' = 0$ AND $\Delta 1'' = 0$

FIGURE 7 - A VARIATION OF ASYMMETRICAL OPERATION

FIGURE 8 - A VARIATION OF ASYMMETRICAL OPERATION

CRYPTOGRAPHIC SYNCHRONIZATION RECOVERY BY MEASURING RANDOMNESS OF DECRYPTED DATA

BACKGROUND OF THE INVENTION

The present invention relates to a device and method for providing a simpler, more efficient method of detecting and recovering from cryptographic synchronization loss on encrypted data communication circuits. The U.S. Government has rights in this invention pursuant to Contract No. DE-AC04-76DP00798 and AT&T Technologies, Inc.

Presently, crypto operation centers use many different models of data encryption devices in both multiplexed and non-multiplexed applications with a wide variety of digital data communication protocols. This is especially true of the U.S. Government. In order to detect cryptographic synchronization loss and to affect recovery, many different methods are used. These methods all involve identifying intelligent information in the decrypted received data.

This detection can be done in a number of ways. For example, a multiplexer or computer which may be remotely located from the encrypting device, can be connected so as to process the received data. The loss of intelligent information in the protocol can be detected by the loss of synchronization, which must be communicated back to the encryptor. Another detection procedure involves the use of a small separate monitoring device which taps the decrypted received data and looks for a specific protocol information in the data. A further detection procedure is to superimpose a signal on the application data at the transmitting end (i.e., taking bandwidth from the application's communication) and a separate detector on the receiving end extracts and detects the superimposed signal before it can be processed by the receiving equipment. This later procedure has the disadvantage of increased bandwidth overhead and places limitations on the design of the communication system. In particular, it disrupts tail circuit clock recovery. The other methods are highly protocol dependent and may require specialized equipment which differs for each encrypted application. Thus, when the protocol or application changes, old synchronization loss detection equipment may not be reusable.

SUMMARY OF THE INVENTION

It is an object of the present invention to provide a device and method of detecting and recovering from cryptographic synchronization loss on encrypted data communication circuits, which is more simple and efficient than the existing methods and which overcomes the above-noted disadvantages.

Another object of the present invention is to provide a method which is independent of the data communication protocol used.

A further object of the present invention is to provide a method which is independent of the data communication protocol used.

A further object of the present invention is to provide a device and method which, when fully implemented, will improve the reliability of encrypted links and will eliminate a myriad of other ancillary communication equipment for each data communication circuit.

Upon further study of the specification and appended claims, further objects and advantages of the present invention will become apparent to those skilled in the art.

BRIEF DESCRIPTION OF THE DRAWINGS

FIG. 3($a$) is a graphic representation of the regions of symmetrical unsynchronized operation in accordance with the present invention based upon $\Delta 1$ and $\Delta 2$, where $\Delta 1 \neq 0$. pp FIG. 3($b$) is a graphic representation of the regions of symmetrical unsynchronized operation in accordance with the present invention based upon $\Delta 1$ and $\Delta 2$, where $\Delta 1 = 0$. pp FIG. 4($a$) is a graphic representation of the regions of asymmetrical unsynchronized operation in accordance with the present invention which is similar to FIG. 3($a$), based upon integers L, N. P, and Q.

FIG. 4($b$) is a graphic representation of the regions of asymmetrical unsynchronized operation in accordance with the present invention which is similar to FIG. 3($b$), based upon integers L and Q.

FIG. 5($a$) is a graphic representation of the regions of unsynchronized operation in accordance with the present invention based upon $\Delta 1'$, $\Delta 1''$, $\Delta 2'$, and 66 2", where $\Delta 1'$ and $\Delta 1'' \neq 0$.

FIG. 5($b$) is a graphic representation of the regions of unsynchronized operation in accordance with the present invention based upon $\Delta 2'$ and $\Delta 2''$, where $\{1'$ and $\{1'' = 0$.

FIG. 6($a$) is a graphic representation of the regions of unsynchronized operation in accordance with the present invention which is similar to FIG. 5($a$), based upon integers L, N, P, and Q.

FIG. 6($b$) is a graphic representation of the regions of unsynchronized operation in accordance with the present invention which is similar to FIG. 5($b$).

DETAILED DESCRIPTION

The methods currently used, such as those discussed above, involve searching for specific patterns in the received data stream, namely, intelligent information. If the intelligent information is found, the currently used methods presume synchronized operation. In contrast to such methods, the present invention searches for a lack of any specific pattern or intelligent information in the received data.

Cyphertext is designed to resemble random data in order to mask any intelligent information in the data. If encryptor/decryptor pairs are out of cryptographic synchronization, the received (decryptor) data resembles cyphertext. Encryptor/decryptor pairs loose synchronization when bit count integrity is lost between the encryptor and the decryptor, (.e., more or fewer symbols are received at the decryptor than were transmitted from the encryptor).

This invention measures the randomness of decrypted received data to determine when cryptographic synchronization loss has occurred. For this application, randomness is the correlation of the distribution of some event in the received data message symbol sequence with the expected distribution of that event in a random symbol sequence. A random symbol sequence is a symbol sequence lacking any pattern; a sequence in which the occurrence of any element of the symbol set has an equal probability.

One characteristic of random binary data is a bit density of 0.5; namely, such a data sequence has the same number of "ones" and "zeros" over a sufficiently long period of time. This characteristic is used as a measure of randomness in the preferred embodiment of this invention, as disclosed hereinafter.

Over a long period of time, it is very difficult to produce perfectly random data by manipulation or loading of data communication protocols. Therefore, an integrating bit density meter will indicate loss of cryptographic synchronization when the bit (ones) density of the decrypted received data becomes very close to 0.5 over a period of time longer than the longest data packet expected on the communicating line.

Figure 1:
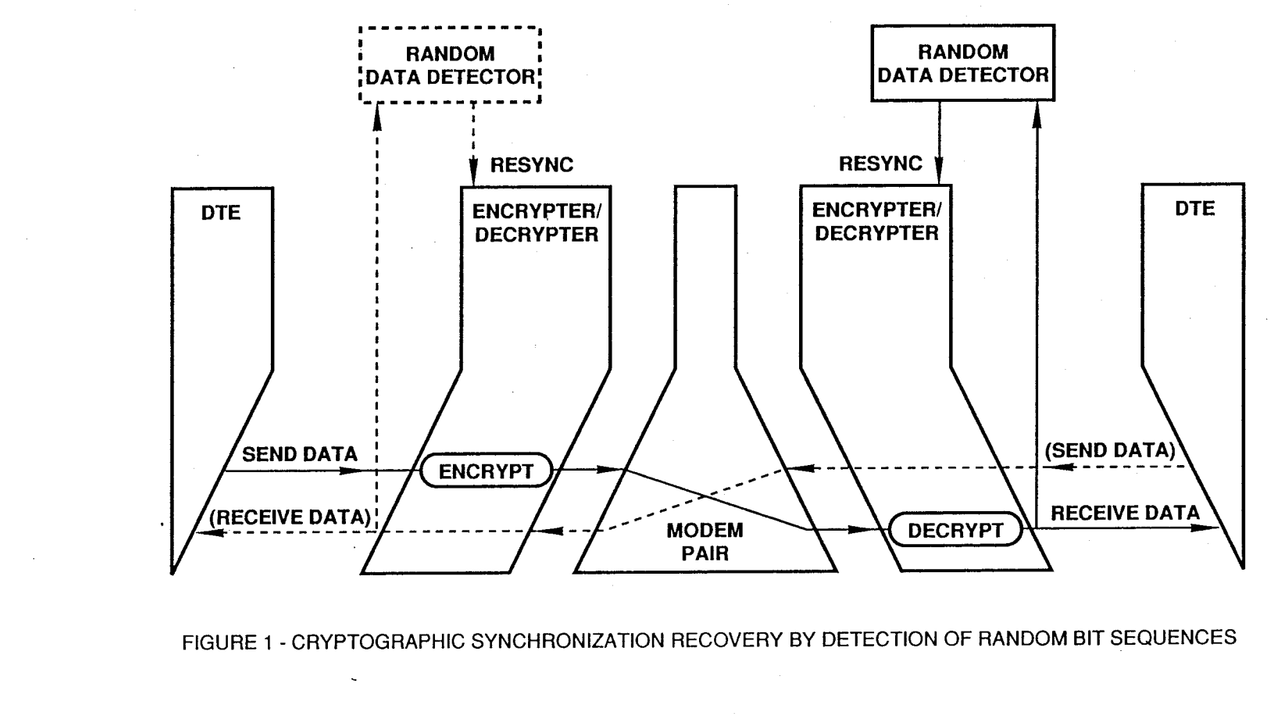
FIG. 1 shows a generalized cryptographic synchronization recovery system which measures the randomness of decrypted data in accordance with the principles of the present invention.

As shown in FIG. 1, in the present invention detectors are placed so as to monitor the randomness of the decrypted received data and can cause the electronically activated resynchronization of the incoming path when the received data becomes sufficiently random. If the encrypter/decrypter pair does not support "end-around-signalling" for resynchronization or "end-around-synchronization," then a method of communicating the resynchronized command from the receiving end to the transmitting end must be provided.

While other randomness characteristics of pseudo-random data can also be used to detect cryptographic out-of-synchronization conditions, the use of ones density performs well in the present invention. In the preferred embodiment of the invention, the bit sequence will be considered random, if the ones density value falls within either of the expressions: $0.5+\Delta 1 <$ ones density $< 0.5+\Delta 2$, or $0.5-\Delta 1 >$ ones density $> 0.5+\Delta 2$, where $\Delta < \Delta 2$ and both $\Delta 1$ and $\Delta 2$ are much smaller than 0.5. This procedure eliminates a small region of ones density around 0.5 which is characteristic of a test pattern generator whose output is exactly 0.5 ones density.

A method of detecting an average ones density of approximately 0.5 is to count one over a sufficiently long data stream, triggering when the count is between certain thresholds. The ones density is the ratio of the number of one bits in a sample period to the total number of bits in the sample period. Thus, if 32,000 ones are counted in $2^{16}$ bits, the ones density is:

$$32,000/65538 = 0.48828$$

Figure 2:
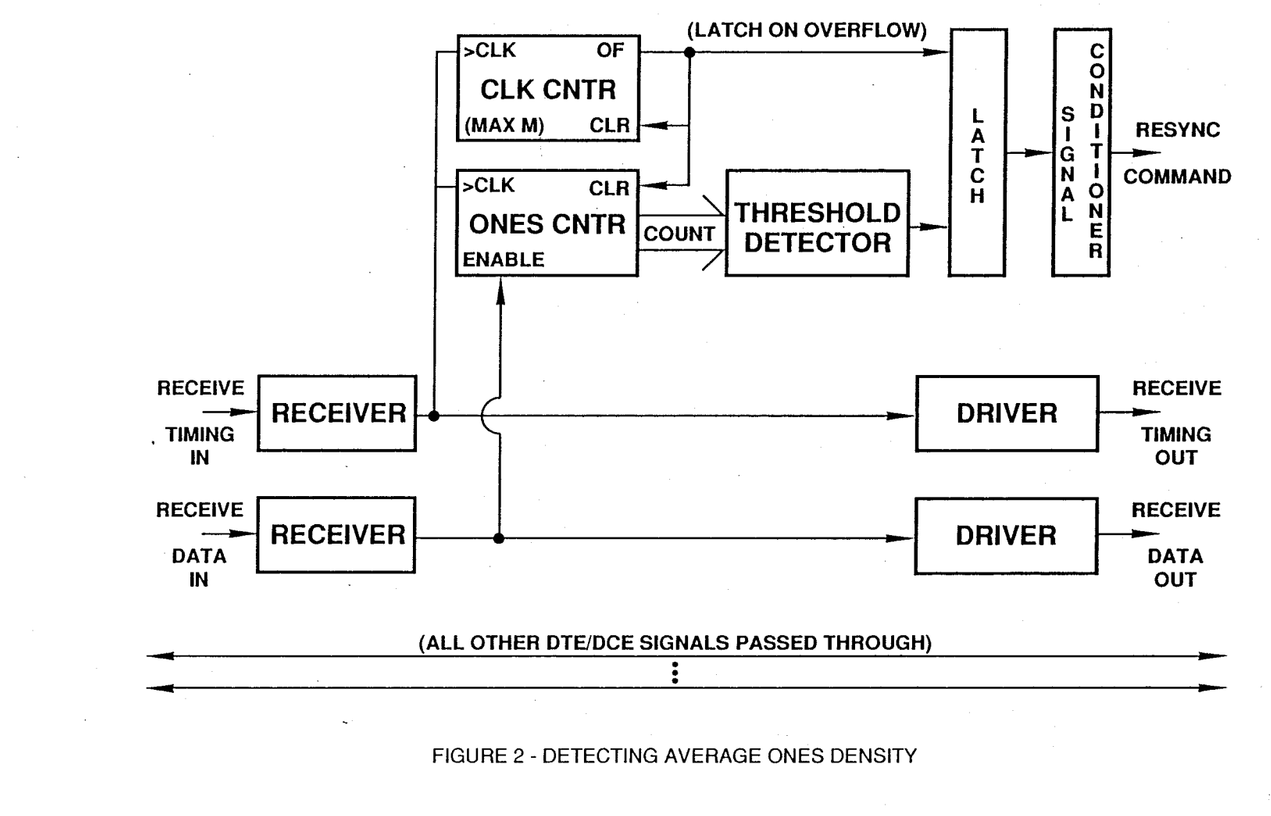
FIG. 2 shows a generalized system for measuring average ones density of about 0.5 in accordance with the principles of the present invention.

As shown in FIG. 2, ones density is measured (averaged over M bits and the synchronization loss detection and triggering of the resynchronization signal results, when the ones density is between certain thresholds. It has been shown that $M = 2^{16}$ is sufficient for most protocols. The thresholds of N, L, P, and Q correspond respectively to the counter values for $(0.5+\Delta 1)$, $(0.5+\Delta 2)$, $(0.5-\Delta 1)$, and $(0.5-\Delta 2)$. Reliable values for $\Delta 1$ and $\Delta 2$, as well as N, L, P, and Q, can be easily determined by one skilled in the art.

The $\Delta$(delta) values are used to determine when a loss of crypto synchronization has occurred and hence initiate an action to resynchronize the cryptos. If the ones density in the received data is measured to be within the predetermined regions having limits set by the delta values, a probable loss of cryptosynchronization is indicated. Synchronized operation is presumed when the densities are outside of this region. It is possible that false detection could occur if the ones density of the decrypted data from a synchronized crypto system is within the loss-of-synchronization region. However, it has been shown that this false detection is rare, because it is difficult to produce intelligible perfectly random characteristics. Thus, the present invention can provide a device and method of detecting and recovering from cryptographic synchronization loss on encrypted data communication circuits which is accurate and which is independent of the data communication protocol used. In the present invention, by counting ones or otherwise measuring the ones density and comparing this measured ones density to a predetermined ones density, the synchronization state of the incoming data can be determined. When unsynchronized data is detected, a signal can be sent to resynchronize the incoming data.

The Ones Counter, Clock Counter, Threshold Detector, Latch and Signal Conditioner in FIG. 2 are representative of a system for the randomness detector as shown in FIG. 1. However, those skilled in the art will realize that other structure or devices can also be used in the present invention in place of that shown in FIG. 2. For example, the device shown in FIG. 2 counts the number of ones in a predetermined length of data. However, other devices can be used which in place of counting ones calculate a ones density and this calculated ones density can be compared to the expression including the delta values as discussed herein.

In FIG. 2, after encrypted data is received through the modem pair depicted in FIG. 1, it is decrypted and the number of ones in M bits of data is counted. In the Threshold Detector, this counted number of ones is compared to integer values N, L, P, and Q. If this counted number of ones satisfies either of the expressions of $N \leq count < L$ or $P \geq count > Q$, this indicates that there has been a synchronization loss and the resync command is triggered, so as to resynchronize the system.

The relationship between $\Delta$(delta) values and the integers values N, L, P, and Q can be explained as follows. In the present invention, synchronization loss can be detected when the bit sequence becomes:

$$0.5 + \Delta 1 < \text{ones density} < 0.5 + \Delta 2, \text{ or}$$

$$0.5 - \Delta 1 > \text{ones density} > 0.5 - \Delta 2.$$

Figure 3A:
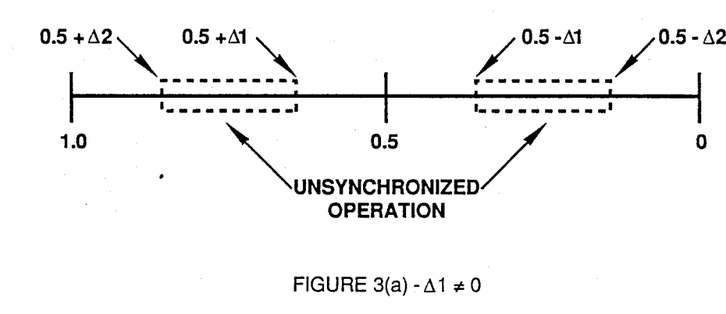
Figure 3B:
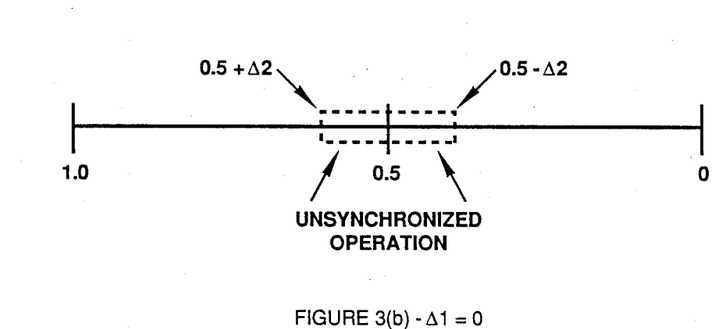

This eliminates a small region of ones densities that is characteristic of test patterns. Additional tests have shown that this small region is not only characteristic of test patterns but also of decrypted data from unsynchronized operation of some cryptographic equipment. For this reason, it is more appropriate to consider synchronization loss when the bit sequence becomes:

$$0.5 + \Delta 1 \leq \text{ones density} < 0.5 + \Delta 2, \text{ or}$$

$$0.5 - \Delta 1 \leq \text{ones density} > 0.5 - \Delta 2$$

and $\Delta 1$ may become equal to zero for cryptographic equipment which exhibit unsynchronized output very close to or equal to a bit density of 0.5. This inequality is graphically described in FIGS. 3(a) and 3(b). The gap between the regions recognized as unsynchronized operation FIGS. 3(a) and 3b) is designed to prevent recognition of certain test patterns, i.e., an alternating 1/0 pattern as unsynchronized operation.

The line segment in FIGS. 3(a) and 3(b) represents the range of ones densities with a zero density point on the right (no ones) and a 1.0 density point on the left (all ones). Midway between these two end points is the 0.5 ones density point. At this point there are an equal number of ones and zeros. The regions that are shown to be within the dashed line rectangles represent the range of ones densities that characterize unsynchronized crypto operation.

In FIG. 3(a), $\Delta 1$ does not equal zero. In this case where are two symmetrical regions, with respect to the 0.5 density point, that define unsynchronized crypto operation. The range of ones densities that define these two regions must be determined for proper operation. One way to do this is to repeatedly measure the ones density during unsynchronized crypto operation until the entire ones density range is determined. As mentioned above, $2^{16}$ bits is a sufficient sample length to accurately detect crypto synchronization loss for most protocols. For this reason, $2^{16}$ bits can be used. However, it is noted that other sample lengths can be used, as long as they are sufficiently long to provide a reliable measurement of ones density.

FIG. 3(b) describes the situation where $\Delta 1$ equals zero. In this case there is a single symmetrical region, with respect to the midway point that defines unsynchronized crypto operation. This condition exists for cryptographic equipment which exhibit unsynchronized output equal to or close to a ones density of 0.5.

Figure 4A:
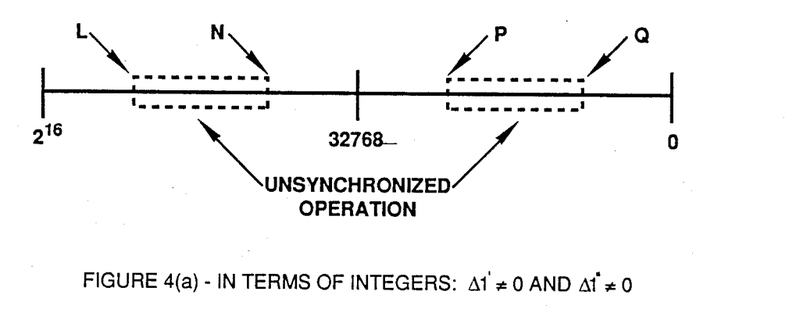

Generally, it is easier to count the number of one data bits than to measure the ones bit density. Accordingly, the number of ones in the receive data stream can be counted during unsynchronized crypto operation. From this, the range of integers that define the two regions can now be determined. The four extreme values of these two regions define the threshold values L, N, P, and Q. FIG 4(a) graphically describes FIG. 3(a) in terms of the number of ones in a sample of $2^{16}$ bits.

Figure 4B:
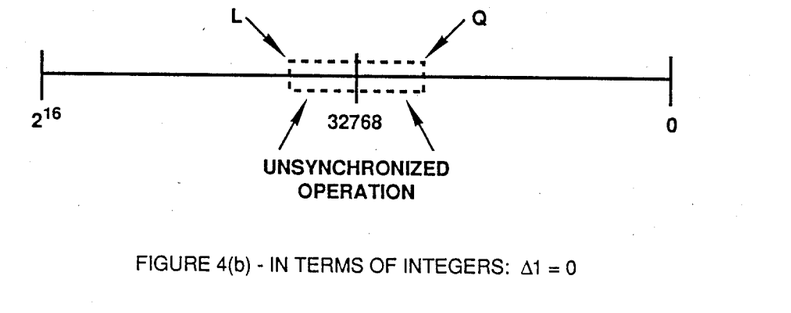

FIG. 4(b) illustrates such a situation in terms of the number of ones in a sample of $2^{16}$ bits. As in the previous case, L and Q represent the thresholds. These values are again set in the same manner as discussed above.

Also, it is possible that the regions defining unsynchronized operation will be asymmetrical for proper operation. That is, loss of cryptographic synchronization will be declared when the bit sequence becomes:

$$0.5 + \Delta 1' \leq \text{one density} < 0.5 + \Delta 2' \text{ or}$$

$$0.5 - \Delta 1'' \geq \text{ones density} > 0.5 - \Delta 2''$$

In this case $\Delta 1'$ need not equal $\Delta 1''$, and $\Delta 2'$ need not equal $\Delta 2''$. For cryptographic equipment which exhibit unsynchronized output very close to or equal to a bit density of 0.5, $\Delta 1'$ and $\Delta ''$ may be set to zero. For these conditions this relationship becomes:

$$0.5 + \Delta 2' > \text{ones density} > 0.5 - \Delta 2''$$

where $0.5 + \Delta 2'$ is the upper limit for the out of sync condition and $0.5 + \{2''$ is the lower limit for the out of sync condition, and $\Delta 2''$ need not equal $\Delta 2''$.

In the situation where $0.5 + \Delta 2'$ and $0.5 - \Delta 2''$ represent the upper and lower thresholds, respectively, and both $\Delta 1'$ and $\Delta 1''$ equal zero, then the ones counter contents are directly compared to two sets of DIP switches that represents the upper and lower thresholds. In the case for a sample length of $2^{16}$, each threshold consists of sixteen DIP switches that can be individually set to represent any binary integer from 0 to $2^{16}$. Thus, each threshold detector can detect bit densities in the range 0.0000000 to 1.0000000 with a resolution of 0.0000153.

As discussed above with respect to FIG. 2, the threshold detector output is activated when $L > \text{count} \geq N$ or $P \geq \text{count} > Q$. Note that both N and P can equal $0.5 \times \text{bit sample length}$. This is equivalent to letting $\Delta 1$ equal zero. Either N and P can be chosen to be $0.5 \times \text{bit sample length}$ or if certain test patterns of bit density close to 0.5 are not to be diagnosed as cryptographic synchronization loss, then N and P can be chosen so that:

$$N > \text{ones count of test pattern} > P$$

The difference (N-P) should be as small as possible in order to avoid improper cryptographic synchronization loss detection (synchronization loss not detected). Also, the expression: $|N - (0.5 \times \text{bit sample length})|$ need not equal the expression $|P - (0.5 \times \text{bit sample length})|$. For a 1:1 test pattern (alternating ones and zeros), and a sample length of $2^{16}$, viable values for N and P are 32770 and 32766 respectively. These values are equivalent to $\Delta 1' = \Delta 1'' = 0.000030518$, as determined by the following calculation:

$$\frac{32770}{65536} - 0.50000 = 0.50000 - \frac{32766}{65536} = 0.000030518$$

On the other hand, the threshold count L and Q can be chosen so that:

$$L > \text{range of bit densities for unsynchronized operation} > Q$$

The difference $L - Q$ should be as small as possible. Also, the expression: $|L - (0.5 \times \text{bit sample length})|$ need not equal the expression $|Q - (0.5 \times \text{bit sample length})|$. This is determined by experimentation with actual cryptographic devices. Viable values for L and Q can be easily determined by those skilled in the art based upon the above discussion.

The various delta values can be indirectly implemented by realizing that for each bit sample length, there is a corresponding ones counter value for $(0.5 + \Delta 1')$, $(0.5 + \Delta 2')$, $0.5 - \Delta 2'')$, and $(0.5 - \Delta 2'')$. That is:

$$(0.5 + \Delta 1') \leq \frac{\text{ones count}}{\text{bit sample length}} < (0.5 + \Delta 2')$$

$$(0.5 - \Delta 1'') \geq \frac{\text{ones count}}{\text{bit sample length}} > (0.5 - \Delta 2'')$$

Rewritten in terms of N, L, P, and Q:

$$N \leq \text{ones count} < L$$

$$P \geq \text{ones count} > Q, \text{ where}$$

$$N = (0.5 + \Delta 1') \times (\text{bit sample length})$$

$$L = (0.5 + \Delta 2') \times (\text{bit sample length})$$

$$P = (0.5 - \Delta 1'') \times (\text{bit sample length})$$

$$Q = (0.5 - \Delta 2'') \times (\text{bit sample length})$$

and N, L, P, and Q are integers greater than or equal to one. In other words, for this case:

$$N = (0.5 + \Delta 1') \times 2^{16}$$

$$L = (0.5 + \Delta 2') \times 2^{16}$$

$$P = (0.5 - \Delta 2') \times 2^{16}$$

$$Q = (0.5 - \Delta 2'') \times 2^{16}$$

As explained above, the delta values can be indirectly implemented by using the integers L, N, P, and Q. If L, N, P, and Q are given the values 35770, 33770, 31766, and 29766, respectively, then the dip switches that represent the thresholds L, N, P, and Q would be set to these values respectively.

Figure 5A:
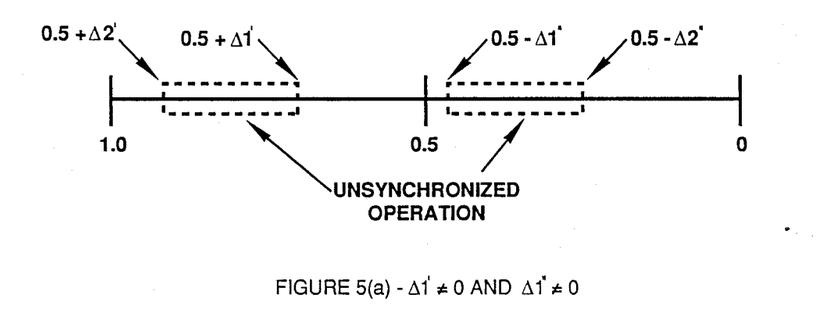
Figure 5B:
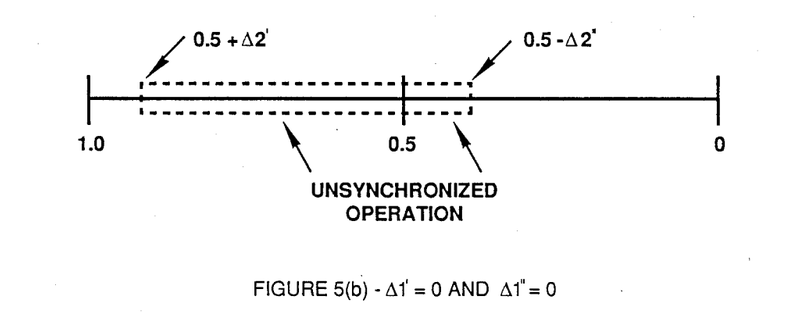
Figure 6A:
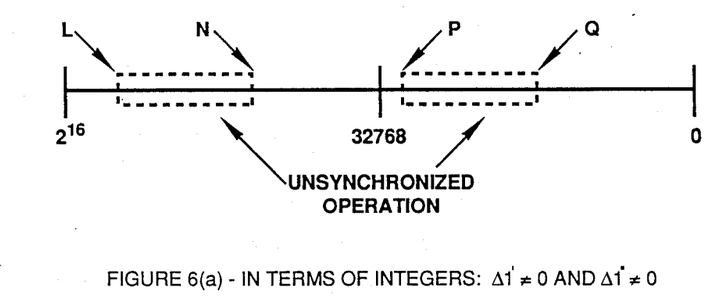
Figure 6B:
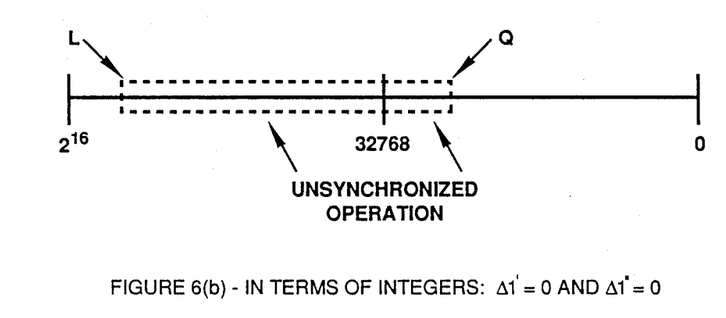

FIGS. 3(a), 3(b), 4(a), and 4(b) illustrate situations where the regions defining the unsynchronized crypto operation are symmetrical to the midway point and were discussed above. However, it is possible that the regions defining unsynchronized operation will be asymmetrical for proper operation. Suppose that the unsynchronized output of a certain type of crypto dictates the regions defining unsynchronized operation to be as shown in FIGS. 5(a) or 5(b). In FIG. 5(a), $\Delta 1'$ is not equal to $\Delta 1''$ and $\Delta 2'$ is not equal to $\Delta 2''$. On the other hand, $\Delta 1' = \Delta 1'' = 0$ in FIG. 5(b). FIGS 6(a) and 6(b) reflect the information in FIGS. 5(a) and 5(b) respectively in terms of the number of ones counted during unsynchronized operation.

The situation presented in FIG. 6(a) is similar to the situation presented in FIG. 4(a). The values for L, N, P, and Q are determined and set up as described above.

The situation shown in FIG. 6(b) is similar to the situation represented by FIG. 4(b). It allows the thresholds to be set asymmetrically for cryptos that exhibit unsynchronized output close to or equal to a ones density of 0.5. The thresholds L and Q are determined and set up as previously described.

Figure 7:
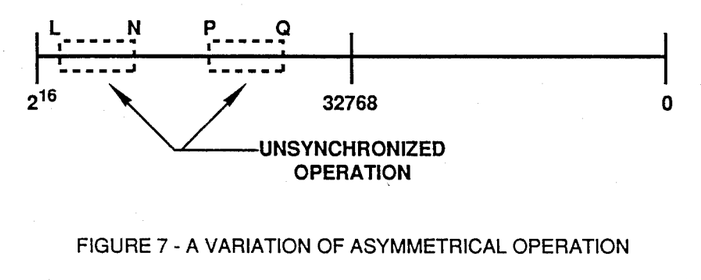
FIG. 7 is a graphic representation showing a variation of asymmetrical unsynchronized operation in accordance with the present invention.
Figure 8:
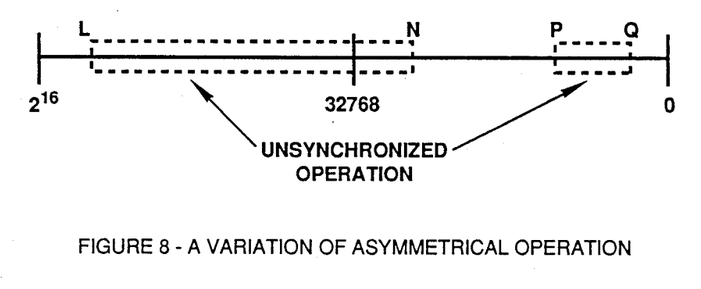
FIG. 8 is another graphic representation showing a variation of asymmetrical unsynchronized operation in accordance with the present invention.

FIGS. 7 and 8 illustrate other variations of asymmetrical operation. The set up procedures for these operations are the same as those discussed above.

It is important to realize that the delta values need not be known in order to properly determine and set up the thresholds L, N, P, and Q for proper operation of the present invention. These simply can be used to define the threshold values with respect to the 0.5 bit density mark and in terms of integers.

Although it is possible to obtain one set of delta values that is appropriate for all the cryptographic sets tried, generally the bit densities (or integer values) for various cryptographic equipments and various communication protocols can be drastically different. Accordingly, appropriate delta values (or integer values) can be determined, as discussed above, for different cryptographic equipment and communication protocols.

The particular device discussed above merely illustrates one embodiment of the invention. It is contemplated that the use of the invention may involve measurements of other characteristics of the message symbol sequence in place of the illustrated one's density. For example, the randomness of non-binary systems, or the number of bit transitions of a digital signal, could be used to determine the synchronization of such systems.

It is intended that the scope of the invention be defined by the claims appended hereto.

We claim:

1. A method of cryptographic synchronization recovery during transmission of an encrypted digital data message comprising receiving said encrypted digital data message through an incoming data path, decrypting said digital data message, monitoring a randomness of said decrypted digital data message, and resynchronizing said incoming data path when said randomness of said decrypted digital data message falls within a predetermined range.

2. The method of claim 1, wherein said monitoring of said randomness of said decrypted digital data message includes determining a ones density thereof.

3. The method of claim 2, wherein resynchronization is triggered when said ones density is between two threshold values.

4. The method of claim 2, wherein when resynchronization is triggered said ones density is within one of two ranges of values.

5. The method of claim 1, wherein monitoring said randomness of said decrypted digital data message includes counting an amount of ones over a predetermined length of said decrypted digital data message.

6. The method of claim 5, wherein resynchronization is triggered when said counter amount of ones is between two threshold values.

7. The method of claim 5, wherein resynchronization is triggered when said amount of counted ones is within one of two ranges of values.

8. A synchronized data communication system including data sending and data receiving units, said data means including data decrypting means for decrypting said encrypted data received from said data sending unit, said data receiving means further including means for determining the randomness of decrypted received data and for triggering a resynchronization signal to said data sending unit when said randomness of said decrypted received data falls within a predetermined range.

9. The system of claim 8, wherein the means for determining the randomness of decrypted received data and for triggering a resynchronization signal includes means for determining the ones density of the decrypted received data, for comparing said determined ones density to two threshold values, and for triggering said resynchronization signal when said determined ones density is between said threshold values.

10. The system of claim 8, wherein said means for determining the randomness of decrypted received data and for triggering a resynchronization signal includes means for determining the ones density of the decrypted received data, for comparing said determined ones density to two ranges of values, and for triggering said resynchronization signal when said determined ones density is within one of said two ranges of values.

11. The system of claim 8, wherein said means for determining the randomness of decrypted received data and for triggering a resynchronization signal includes means for counting ones over a predetermined length of decrypted received data, for comparing a counted number of ones to two threshold values, and for triggering said resynchronization signal when said counted number of ones is between said threshold values.

12. The system of claim 8, wherein said means for determining the randomness of decrypted received data and for triggering a resynchronization signal includes means for counting ones over a predetermined length of said decrypted received said data, for comparing a counted number of ones to two ranges of values, and for triggering said resynchronization signal when said determined ones density is within one of said two ranges of values.

13. A means for measuring randomness of digital data having a plurality of discrete states comprising:
   means for counting occurrences of one of said discrete states within a predetermined length of said digital data;
   means for taking the ratio of said occurrences of one of said discrete states to a total number of occurrences of all of said discrete states within said digital data to determine a density of one of said discrete states within said digital data; and
   means for comparing said density to a plurality of preset ranges of values corresponding to said plurality of states;
   wherein when said density of one of said states is outside said range of values, a degree of randomness of said digital data is determined.

14. A means for measuring randomness of digital data having a plurality of discrete states, as in claim 13, wherein said digital data is binary, one of said discrete states is indicated by a one, and said density is a ones density.

* * * * *